United States Patent
Tsai

(10) Patent No.: US 10,755,423 B2
(45) Date of Patent: Aug. 25, 2020

(54) IN-VEHICLE CAMERA DEVICE, MONITORING SYSTEM AND METHOD FOR ESTIMATING MOVING SPEED OF VEHICLE

(71) Applicant: Getac Technology Corporation, Hsinchu County (TW)

(72) Inventor: Kun-Yu Tsai, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 128 days.

(21) Appl. No.: 16/164,048

(22) Filed: Oct. 18, 2018

(65) Prior Publication Data
US 2020/0126240 A1    Apr. 23, 2020

(51) Int. Cl.
*G06T 7/246* (2017.01)

(52) U.S. Cl.
CPC .... *G06T 7/248* (2017.01); *G06T 2207/30252* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,690,294 B1* | 2/2004 | Zierden | ............ | G08G 1/052 340/933 |
| 2006/0269104 A1* | 11/2006 | Ciolli | ............ | G08G 1/052 382/104 |
| 2010/0052947 A1* | 3/2010 | Lin | ............ | G07C 9/00174 340/932.2 |
| 2011/0242319 A1* | 10/2011 | Miyajima | ............ | G01S 19/48 348/148 |
| 2012/0148094 A1* | 6/2012 | Huang | ............ | G06K 9/00785 382/103 |
| 2012/0206602 A1* | 8/2012 | Clucas | ............ | G06T 7/246 348/149 |
| 2013/0033600 A1* | 2/2013 | Higuchi | ............ | G06T 7/248 348/148 |
| 2013/0038681 A1* | 2/2013 | Osipov | ............ | G08G 1/054 348/36 |

(Continued)

OTHER PUBLICATIONS

K. Yilmaz,"A Smart Hybrid License Plate Recognition System Based on Image Processing using Neural Network and Image Correlation," 2011 International Symposium on Innovations in Intelligent Systems and Applications, Jun. 15-18, 2011, pp. 148-152.*

(Continued)

*Primary Examiner* — Omar S Ismail
(74) *Attorney, Agent, or Firm* — Locke Lord LLP; Tim Tingkang Xia, Esq.

(57) ABSTRACT

A method for estimating a moving speed of a vehicle includes: sequentially capturing, by an image capturing unit, a first driving vehicle image and a second driving vehicle image having a time difference; performing image analysis on the first driving vehicle image to obtain a first pixel area and a first inclination of a first license plate image; performing image analysis on the second driving vehicle image to obtain a second pixel area and a second inclination of a second license plate image; and estimating the moving speed according to the first pixel area, the first inclination, the second pixel area, the second inclination and the time difference.

9 Claims, 10 Drawing Sheets

(56) References Cited

U.S. PATENT DOCUMENTS

| | | | | |
|---|---|---|---|---|
| 2013/0265414 A1* | 10/2013 | Yoon | ............... | G08G 1/161 |
| | | | | 348/118 |
| 2014/0253787 A1* | 9/2014 | Shu | ............... | G02B 7/34 |
| | | | | 348/353 |
| 2018/0082581 A1* | 3/2018 | Suzuki | ............... | G08G 1/04 |

OTHER PUBLICATIONS

Zheng Tang,"Single-camera and inter-camera vehicle tracking and 3D speed estimation based on fusion of visual and semantic features,", 2018 IEEE/CVF Conference on Computer Vision and Pattern Recognition Workshops (CVPRW) , Jun. 18-22, 2018, pp. 108-113.*

Yilmaz,"A Smart Hybrid License Plate Recognition System Based on Image Processing using Neural Network and Image Correlation," 2011 International Symposium on Innovations in Intelligent Systems and Applications, Jun. 15-18, 2011, pp. 148-152.*

Lihong Zheng,"Accuracy Enhancement for License Plate Recognition," 2010 10th IEEE International Conference on Computer and Information Technology (CIT 2010),Jun. 29-Jul. 1, 2010,pp. 511-515.*

Christos-Nikolaos E. Anagnostopoulos,"License Plate Recognition From Still Images and Video Sequences: A Survey," IEEE Transactions on Intelligent Transportation Systems, vol. 9, No. 3, Sep. 2008,pp. 377-385.*

Xinchen Liu,"PROVID: Progressive and Multimodal Vehicle Reidentification for Large-Scale Urban Surveillance," IEEE Transactions on Multimedia, vol. 20, No. 3, Mar. 2018,pp. 645-656.*

* cited by examiner

| Pixel area (pixel) / Relative distance (mm) / Lens focal length (mm) | 40 | 80 | 120 | 160 | 200 | 240 | 280 | 320 | 360 | 400 |
|---|---|---|---|---|---|---|---|---|---|---|
| 4 | 8137 | 4071 | 2715 | 2037 | 1631 | 1360 | 1166 | 1021 | 908 | 817 |
| 6 | 12206 | 6106 | 4073 | 3056 | 2446 | 2039 | 1749 | 1531 | 1362 | 1226 |
| 8 | 16275 | 8141 | 5430 | 4075 | 3261 | 2719 | 2332 | 2041 | 1815 | 1635 |
| 12 | 24412 | 12212 | 8145 | 6112 | 4892 | 4079 | 3498 | 3062 | 2723 | 2452 |
| 16 | 32549 | 16283 | 10860 | 8149 | 6523 | 5438 | 4664 | 4083 | 3631 | 3269 |
| 25 | 50858 | 25442 | 16969 | 12733 | 10192 | 8497 | 7287 | 6379 | 5673 | 5108 |
| 35 | 71202 | 35618 | 23757 | 17827 | 14268 | 11896 | 10202 | 8931 | 7942 | 7152 |
| 48 | 97648 | 48848 | 32581 | 24448 | 19568 | 16315 | 13991 | 12248 | 10892 | 9808 |

FIG.12

IN-VEHICLE CAMERA DEVICE, MONITORING SYSTEM AND METHOD FOR ESTIMATING MOVING SPEED OF VEHICLE

BACKGROUND OF THE INVENTION

Field of the Invention

The present invention relates to moving speed estimation, and more particularly to an in-vehicle camera device, a monitoring system and a method for estimating a moving speed of a vehicle.

Description of the Prior Art

To ensure driving safety of the general public, law enforcement officers need to monitor moving speeds (also referred to as vehicle speeds) of vehicles driving on roads. In response to traffic management and monitoring requirements of law enforcement officers, current speed detection devices are mostly deployed on roads to detect vehicle speeds of different vehicles and collect traffic violation information of these vehicles.

In general, a vehicle speed detection device is installed on a stationary post and detects at a fixed location vehicle speeds of vehicles passing by this location. However, hindered by legal regulations and road construction designs, such stationary posts cannot be set up at all desired locations. Further, in the modern society, laser speedometers that frequently serve as vehicle speed detection devices may be quite costly.

SUMMARY OF THE INVENTION

In one embodiment, a method for estimating a moving speed of a vehicle includes: sequentially capturing, by an image capturing unit, a first driving vehicle image and a second driving vehicle image having a time difference; performing image analysis on the first driving vehicle image to obtain a first pixel area and a first inclination of a first license plate image; performing image analysis on the second driving vehicle image to obtain a second pixel area and a second inclination of a second license plate image; and estimating the moving speed according to the first pixel area, the first inclination, the second pixel area, the second inclination and the time difference.

In one embodiment, an in-vehicle camera device includes an image capturing unit and a processing unit. The image capturing unit sequentially captures a first driving vehicle image and a second driving vehicle image of the vehicle, wherein the first driving vehicle image and the second driving vehicle image have a time difference. The processing unit performs image analysis on the first driving vehicle image to obtain a first pixel area and a first inclination of a first license plate image, performs image analysis on the second driving vehicle image to obtain a second pixel area and a second inclination of a second license plate image, and estimates the moving speed of the vehicle according to the first pixel area, the first inclination, the second pixel area, the second inclination and the time difference.

In one embodiment, a monitoring system includes an in-vehicle camera device and a server device. The in-vehicle camera device sequentially captures a first driving vehicle image and a second driving vehicle image of the vehicle, wherein the first driving vehicle image and the second driving vehicle image have a time difference. The server device receives the first driving vehicle image and the second driving vehicle image, performs image analysis on the first driving vehicle image to obtain a first pixel area and a first inclination of a first license plate image, performs image analysis on the second driving vehicle image to obtain a second pixel area and a second inclination of a second license plate image, and estimates the moving speed of the vehicle according to the first pixel area, the first inclination, the second pixel area, the second inclination and the time difference.

In conclusion, the in-vehicle camera device, the monitoring system and the method for estimating a moving speed of a vehicle according to embodiments of the present invention achieve license plate recognition (i.e., the first license plate image and the second license plate image) by performing image analysis on the first driving vehicle image and the second driving vehicle image sequentially captured, while estimate the moving speed of the vehicle through the first pixel area, the first inclination, the second pixel area, the second inclination and the time difference obtained by analysis. Thus, the present invention better dynamically determines whether the vehicle exceeds a speed limit without having to measure the moving speed of the vehicle by more costly speed detection devices such as laser speedometers.

Detailed features and advantages of the present invention are given in detail in the embodiments below. The associated disclosure is sufficient to enable a person skilled in the art to fully understand the technical contents of the present invention and perform implementation accordingly. Further, based on the disclosure, the claims and the drawings of the application, a person skilled in the art can easily understand related objects and advantages of the present invention.

BRIEF DESCRIPTION OF THE DRAWINGS

FIG. 12 is a relationship schematic diagram of lens focal length, pixel area and relative distance according to an embodiment;

DETAILED DESCRIPTION OF THE EMBODIMENTS

Figure 1:
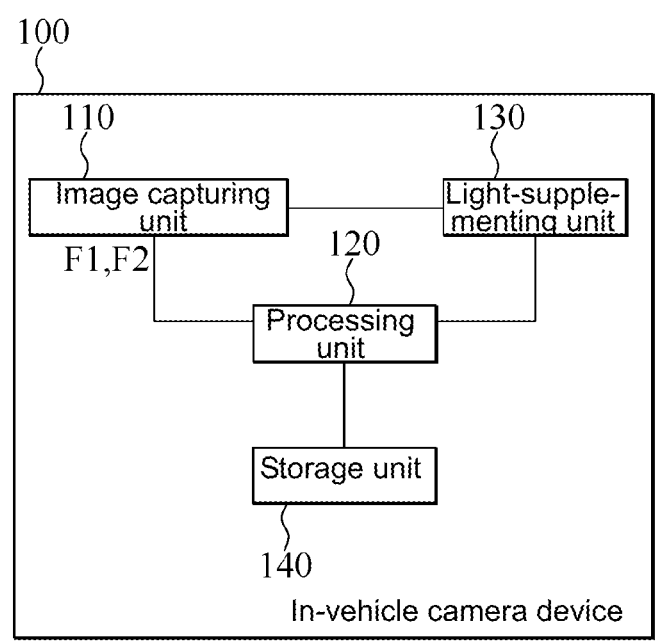
FIG. 1 is a block schematic diagram of an in-vehicle camera device according to an embodiment.

FIG. 1 shows a block schematic diagram of an in-vehicle camera device according to an embodiment. Referring to FIG. 1, in general, the in-vehicle camera device 100 is mounted in a transportation vehicle, and is for capturing and recording driving vehicle images. In some embodiments, the transportation vehicle may be, for example but not limited to, an automobile or a motorcycle. It should be noted that, the present invention is not limited to the above examples, and any transportation vehicle applicable to the in-vehicle camera device 100 is covered within the scope of the present invention.

In one embodiment, the in-vehicle camera device 100 includes an image capturing unit 110, and a processing unit 120 coupled to the image capturing unit 110. The in-vehicle camera device 100 may further include a light-supplementing unit 130, which is coupled to the image capturing unit 110 and the processing unit 120.

The image capturing unit 110 captures a plurality of driving vehicle images. Further, these images may be a plurality of frames captured within a continuous time period by the image capturing unit 110. The light-supplementing unit 130 outputs supplement light to assist image capturing of the image capturing unit 110.

In some embodiments, the image capturing unit 110 includes a set of lens and light sensing element. The light sensing element is, for example, a complementary metal oxide semiconductor (CMOS) or a charge-coupled device (CCD). Further, the light-supplementing unit 130 may be implemented by, for example, a light emitting diode (LED), an infrared diode light emitting diode (IR LED), a halogen light or a laser light source. It should be noted that the present invention is not limited to the above light sources.

The processing unit 120 can rapidly estimate a moving speed of a vehicle according to a method for estimating a moving speed of a vehicle according to any embodiment of the present invention. In some embodiments, the processing unit 120 may be a silicon-on-chip (SoC), a central processing unit (CPU), a microprocessor (MCU) or an application-specific circuit (ASIC). It should be noted that, the present invention is not limited to the above examples.

Figure 2:
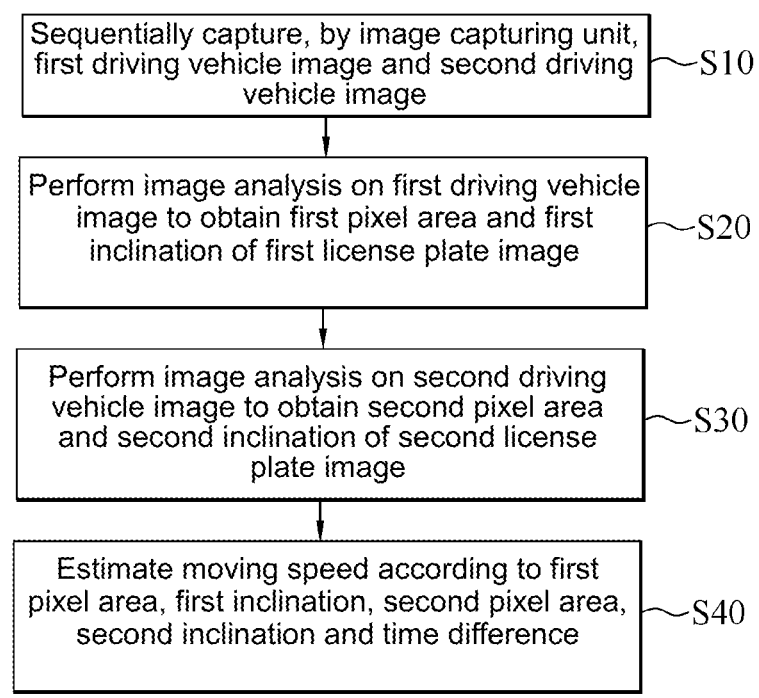
FIG. 2 is a flowchart of a method for estimating a moving speed of a vehicle according to an embodiment.
Figure 3:
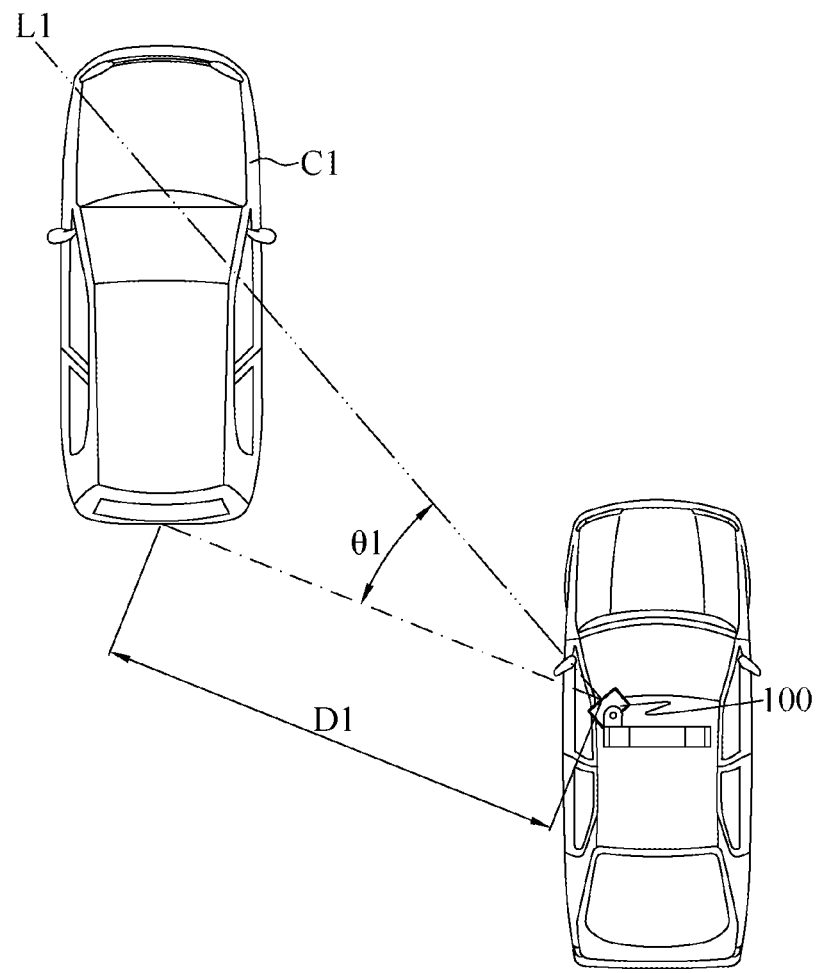
FIG. 3 is a schematic diagram of an in-vehicle camera device capturing an image of a vehicle at a first time point.
Figure 4:
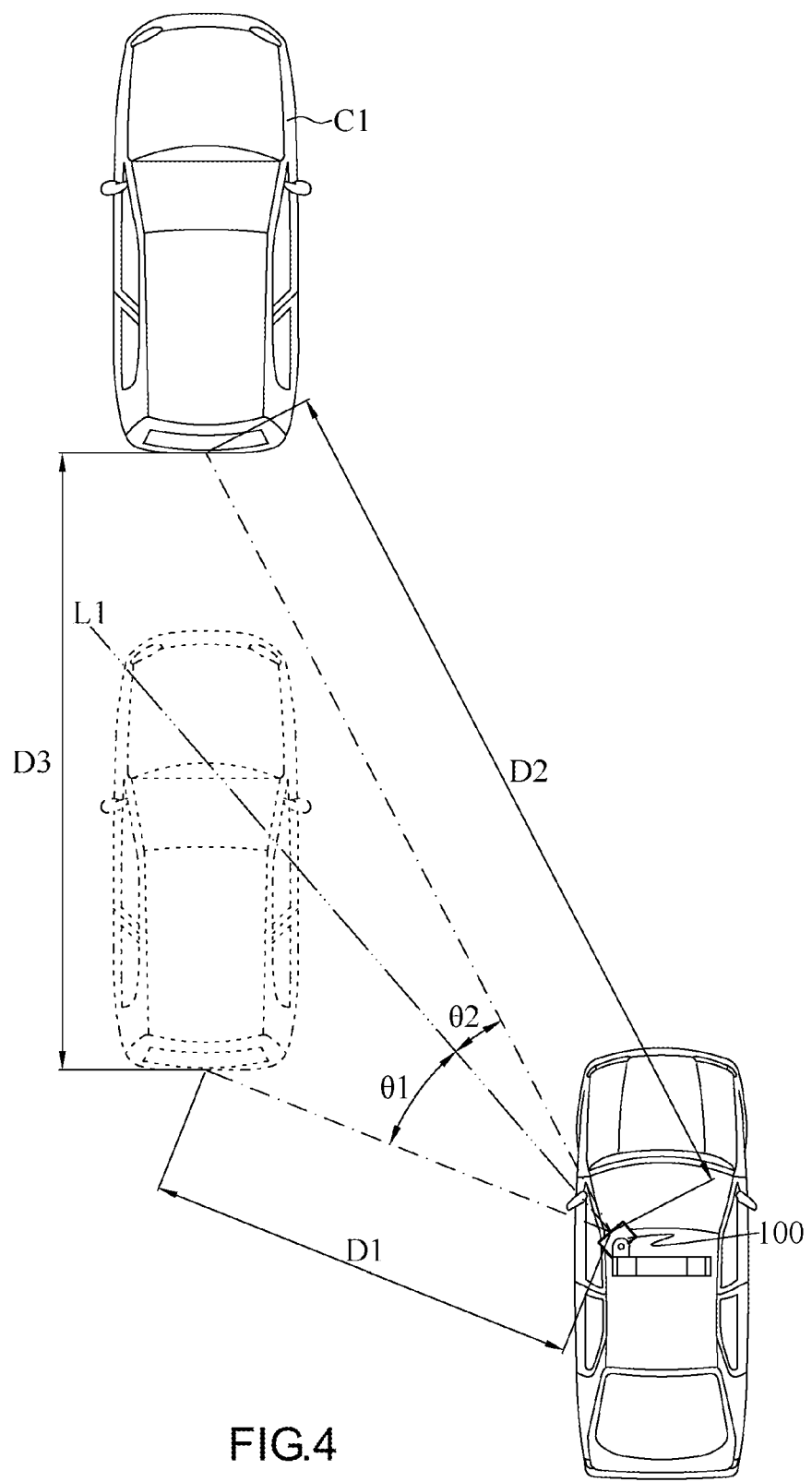
FIG. 4 is a schematic diagram of an in-vehicle camera device capturing an image of a vehicle at a second time point.

FIG. 2 shows a flowchart of a method for estimating a moving speed of a vehicle according to an embodiment of the present invention. FIG. 3 shows a schematic diagram of an in-vehicle camera device capturing an image of a vehicle at a first time point. FIG. 4 shows a schematic diagram of an in-vehicle camera device capturing an image of a vehicle at a second time point. Referring to FIG. 1 to FIG. 4, in a method for estimating a moving speed of a vehicle according to an embodiment, the processing unit 120 of the in-vehicle camera device 100 performs image capturing within an image capturing range by using the image capturing unit 110, such that the image capturing unit 110 can sequentially capture a first driving vehicle image F1 and a second driving vehicle image F2 of a vehicle C1 when the vehicle C1 enters the image capturing range of the image capturing unit 110 (step S10). The first driving vehicle image C1 is an image that the image capturing unit 110 captures at a first time point after the vehicle C1 enters the image capturing range of the image capturing unit 110, and the second driving vehicle image F2 is an image that the image capturing unit 110 captures at a second time point later than the first time point. Thus, the first driving vehicle image F1 and the second driving vehicle image F2 have a time difference, which is specifically a difference between the second time point and the first time point.

In step S10 according to an embodiment, the image capturing unit 110 can capture the first driving vehicle image F1 and the second driving vehicle image F2 according to a predetermined image capturing frequency by means of global shutter. However, the present invention is not limited to the above example. In one embodiment, the image capturing unit 110 can capture the first driving vehicle image F1 and the second driving vehicle image F2 by means of rolling shutter. In one embodiment, the image capturing frequency may be 60 frames per second (FPS). In another embodiment, the image capturing frequency may also be 30 FPS.

In one embodiment, the first driving vehicle image F1 may include a plurality of pixels, each of which may display a corresponding grayscale according to one grayscale level among a plurality of grayscale levels. Similarly, the second driving vehicle image F2 displays a plurality of pixels corresponding to a grayscale according to one grayscale level among a plurality of grayscale levels. In other words, presentation forms of the first driving vehicle image F1 and the second driving vehicle image F2 may be determined according to the grayscales displayed by pixels included in and positions of the first driving vehicle image F1 and the second driving vehicle image F2.

In some embodiments, the first driving vehicle image F1 and the second driving vehicle image F2 can each consist of 1280*720 pixels. However, the present invention is not limited to the above example. The first driving vehicle image F1 and the second driving vehicle image F2 can each consist of 360*240 pixels, 1920*1080 pixels, or any other number of pixels conforming to a display format standard. Further, the number of levels of the plurality of grayscales may be 256. However, the present invention is not limited to the above example, and the number of levels of grayscales may be determined according to the performance capability of the image capturing unit 110. For example, the image capturing unit 110 may include an analog-to-digital conversion circuit, and provide a performance capability of 1024 (i.e., $2^{10}$) grayscales when the analog-to-digital conversion circuit is 10-bit; and so forth.

After the first driving vehicle image F1 is obtained, the processing unit 120 can perform image analysis on the first driving vehicle image F1 to determine whether the first driving vehicle image F1 covers an image of a license plate of the vehicle. Further, when it is determined that the first driving vehicle image F1 covers the image of the license plate of the vehicle (to be referred to as a first license plate image M1), the processing unit 120 next obtains from the first driving vehicle image F1 the size of a first pixel area of the first license plate image M1 and the value of a first inclination θ1 of the first license plate image M1 (step S20).

In some embodiments, the license plate of the vehicle may be applied with a high reflective coating, and with the assistance of the light-supplementing unit 130, the license plate is expected to appear as the brightest image in the first driving vehicle image F1 captured by the image capturing unit 110 of the in-vehicle camera device 100. Thus, the processing unit 120 can determine whether the first driving vehicle image F1 covers the first license plate image M1 according to a histogram of the first driving vehicle image F1.

Figure 5:
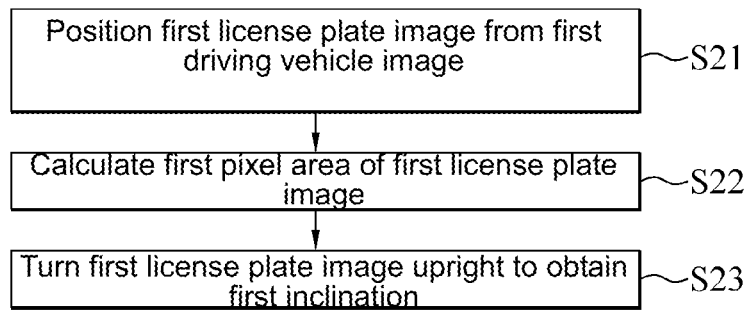
FIG. 5 is a flowchart of step S20 in FIG. 2 according to an embodiment.
Figure 6:
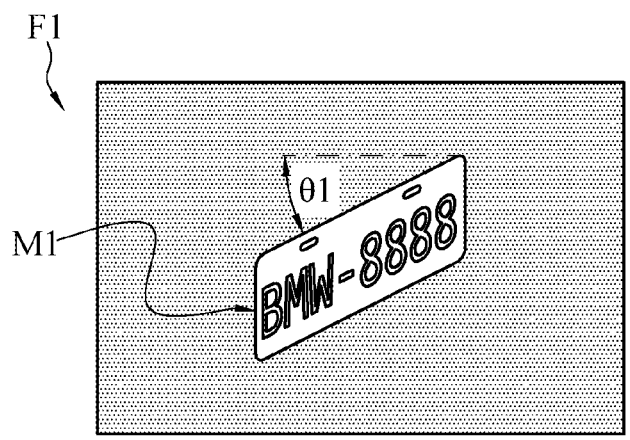
FIG. 6 is a schematic diagram of the first driving vehicle image captured by the in-vehicle camera device in FIG. 3.
Figure 7:
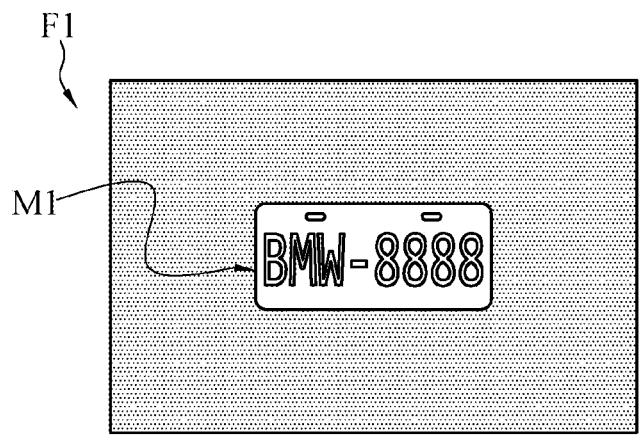
FIG. 7 is a schematic diagram of the first license plate image in FIG. 6 having been turned upright.

FIG. 5 shows a flowchart of step S20 in FIG. 2 according to an embodiment of the present invention. FIG. 6 shows a schematic diagram of the first driving vehicle image captured by the vehicle camera device in FIG. 3. FIG. 7 shows a schematic diagram of the first license plate image in FIG. 6 having been turned upright. Referring to FIG. 1 to FIG. 7, in step S20 according to an embodiment, the processing unit 120 can position of the license plate image in the first driving vehicle image F1 so as to position the range of the first license plate image M1 in the first driving vehicle image F1 (step S21). The processing unit 120 can then calculate the size of the first pixel area of the first license plate image M1 on the basis of the first license plate image M1 obtained in step S21 (step S22). Further, the processing unit 120 can perform image correction on the first license plate image M1 so as to turn the first license plate image M1 upright and obtain the value of the first inclination θ1 of the first license plate image M1 (step S23).

In step S21 according to an embodiment, the processing unit 120 can perform edge detection on the first driving vehicle image F1 through an edge detection operator, such as Sobel, Laplace, Robert, Prewitt and Canny, so as to identify four borders of the first license plate image M1 and position the first license plate image M1.

In step S22 according to an embodiment, the processing unit 120 can calculate the number of pixels covered in the range demarcated by the four borders of the first license plate image M1 to obtain the first pixel area of the first license plate image M1.

In step S23 according to an embodiment, the processing unit 120 can first obtain, according to one of the four borders of the first license plate image M1, the first inclination θ1 between this border and a horizontal line or a vertical line, and turn the first license plate image M1 according to the first inclination θ1. At this point, the processing unit 120 selects the longest border among the four borders of the first license plate image M1 to obtain the first inclination θ1 between this border and the horizontal line, as shown in FIG. 6. In some embodiments, the processing unit 120 corrects the first license plate image M1 through an affine transform, and the first license plate image M1 having been turned upright may appear as that shown in FIG. 7.

Figure 8:
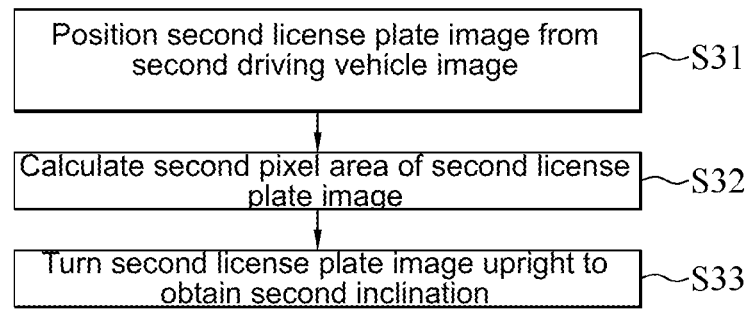
FIG. 8 is a flowchart of step S30 in FIG. 2 according to an embodiment.
Figure 9:
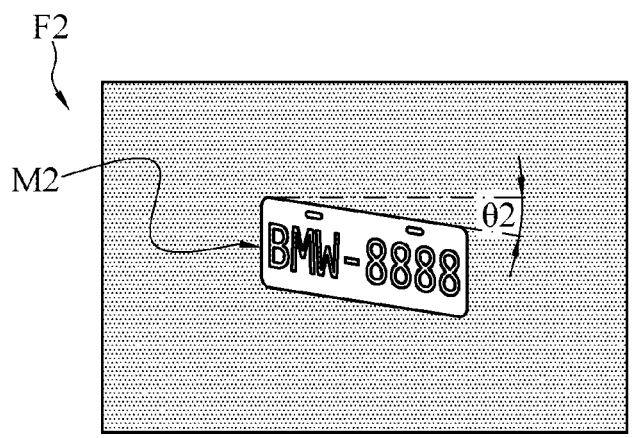
FIG. 9 is a schematic diagram of a second driving vehicle image captured by the in-vehicle camera device in FIG. 4.
Figure 10:
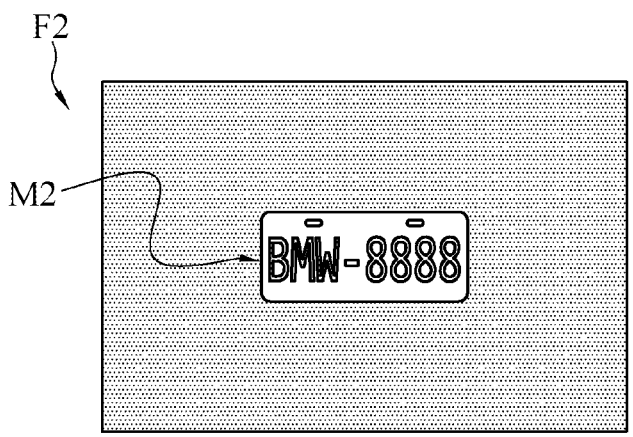
FIG. 10 is a schematic diagram of the second license plate image in FIG. 9 having been turned upright.

FIG. 8 shows a flowchart of step S30 in FIG. 2 according to an embodiment. FIG. 9 shows a schematic diagram of a second driving vehicle image captured by the in-vehicle camera device in FIG. 4. FIG. 10 shows a schematic diagram of the second driving vehicle image in FIG. 9 having been turned upright. Referring to FIG. 1 to FIG. 10, similarly, after the second driving vehicle image F2 is obtained, the processing unit 120 can perform image analysis on the second driving vehicle image F2 to determine whether the second driving vehicle image F2 covers an image of the license plate of the vehicle. Further, when the processing unit 120 determines that the second driving vehicle image F2 covers the image of the license plate of the vehicle (to be referred to a second license plate image M2), the processing unit 120 next obtains the size of a second pixel area of the second license plate image M2 and the value of a second inclination θ2 of the second license plate image M2 from the second driving vehicle image F2 (Step S30).

In step S30 according to an embodiment, the processing unit 120 can position the license plate image of the second driving vehicle image F2 so as to position the range of the second license plate image M2 in the second driving vehicle image F2 (step S31). Next, the processing unit 120 can calculate the size of the second pixel area of the second license plate image M2 on the basis of the second license plate image M2 obtained in step S31 (step S32). Further, the processing unit 120 can perform image correction on the second license plate image M2 so as to turn the second license plate image M2 upright and obtain the value of the second inclination θ2 of the second license plate image M2 (Step S33).

At this point, implementation details of step S31 to step S33 are substantially identical to those of step S21 to step S23, and are omitted herein.

After step S20 and step S30 are performed, the processing unit 120 can estimate the moving speed of the vehicle according to the first pixel area, the first inclination θ1, the second pixel area, the second inclination θ2 and the time difference (step S40).

Figure 11:
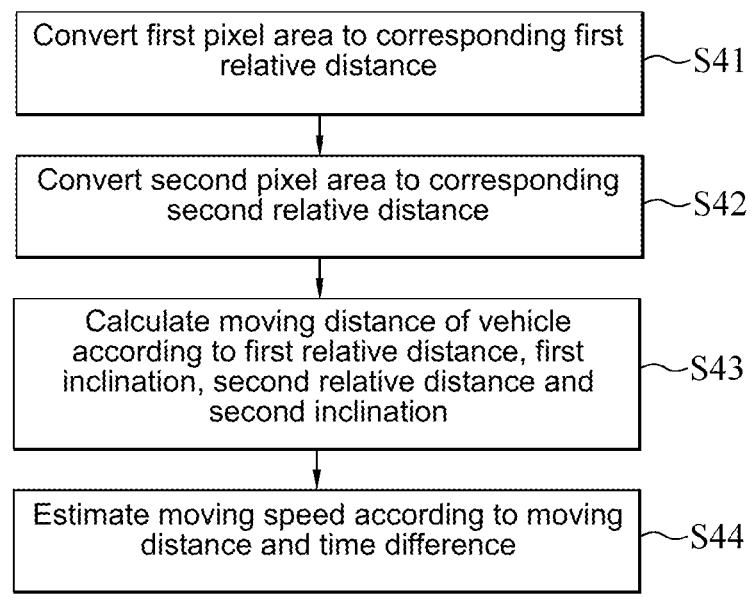
FIG. 11 a flowchart of step S40 in FIG. 2 according to an embodiment.

FIG. 11 shows a flowchart of step S40 in FIG. 2 according to an embodiment. Referring to FIG. 1 to FIG. 11, in step S40 according to an embodiment, the processing unit 120 can convert the size of the first pixel area of the first license plate image M1 to a corresponding first relative distance D1 (step S41), wherein the first relative distance D1 represents a relative distance between the license plate of the vehicle C1 and the in-vehicle camera device 100 at the first time point. Similarly, the processing unit 120 can convert the size of the second pixel area of the second license plate image M2 to a corresponding second relative distance D2 (step S42), wherein the second relative distance D2 represents a relative distance between the license plate of the vehicle C1 and the in-vehicle camera device 100 at the second time point.

In step S41 (or step S42) according to an embodiment, the processing unit 120 can convert the size of the first pixel area of the first license plate image M1 to the first relative distance D1 corresponding to the first time point (or the second relative distance D2 corresponding to the second time point) of the vehicle C1 by means of a look-up table.

In some embodiments, the conversion between the first relative distance D1 and the first pixel area (or the second relative distance D2 and the second pixel area) may be associated with the lens focal length of the image capturing unit 110. Thus, the processing unit 120 can further detect the lens focal length of the image capturing unit 110 so as to convert the first relative distance D1 from the first pixel area according to the lens focal length (or convert the second pixel area to the second relative distance D2 according to the lens focal length).

FIG. 12 is a relationship schematic diagram of lens focal length, pixel area and relative distance according to an embodiment. In one embodiment, an exemplary relationship mapping table of the lens focal length, pixel area (i.e., the first pixel area or the second pixel area) and the relative distance (i.e., the first relative distance D1 or the second relative distance D2) of the image capturing unit 110 may be as shown in FIG. 12. The lens focal length is in a unit of mm, the pixel area is in a unit of pixels, and the relative distance is in a unit of mm.

Referring to FIG. 12, in one example, if the processing unit 120 obtains that the lens focal length of the image capturing unit 110 is 6 mm and the pixel area is 80 pixels, the processing unit 120 obtains from looking up and comparison that the corresponding relative distance is 6106 mm. In another example, if the processing unit 120 obtains that the lens focal length of the image capturing unit 110 is 8 mm and the pixel area is 140 pixels, although the processing unit 120 cannot directly identify the value of the corresponding relative distance through looking up and comparison, the processing unit 120 can however obtain the relative distance through conversion and interpolation. At this point, because the value of the current pixel area is between 120 pixels and 160 pixels, the processing unit 120 can obtain through conversion and interpolation the value corresponding to the relative distance as 4752.5 mm according to 5430 mm corresponding to the pixel area of 120 pixels and 4075 mm corresponding to the pixel area of 160 pixels.

At this point, the first inclination θ1 is substantially equal to an included angle between the license plate of the vehicle C1 and a lens axis L1 of the image capturing unit 110 at the first time point; the second inclination θ2 is substantially equal to an included angle between the license plate of the vehicle C1 and the lens axis L1 of the image capturing unit 110 at the second time point, as shown in FIG. 4. Thus, after the first relative distance D1, the first inclination θ1, the second relative distance D2 and the second inclination θ2 are obtained, the processing unit 120 can accordingly estimate a moving distance D3 of the vehicle C1 in this time difference (step S43). In step S43 according to an embodiment, the processing unit 120 obtains the moving distance D3 through a trigonometry function equation; however, the present invention is not limited thereto.

The processing unit 120 finally estimates the moving speed of the vehicle C1 according to the moving distance D3 obtained in step S43 and the time difference (step S44).

In some embodiment, the method for estimating a moving speed of a vehicle of any of the embodiments of the present invention may be implemented by a readable recording medium device. The readable recording medium device stores a plurality of program codes, which enable the in-vehicle camera device 100 to perform the method for estimating a moving speed of a vehicle of any of the foregoing embodiments when the in-vehicle camera device 100 loads and executes the plurality of program codes. In one embodiment, the readable recording medium device may be a storage unit 140 in the in-vehicle camera device 100. The storage unit 140 is coupled to the processing unit 120, and may be further used to store any data needed for the method for estimating a moving speed, e.g., the first driving vehicle image F1, the second driving vehicle image F2, the first time point, the second time point, the time difference, the first pixel area, the first inclination θ1, the second pixel area, the second inclination θ2, the first relative distance D1, the second relative distance D2, the lens focal length and the moving distance D3. In another embodiment, the readable recording medium device may be a remote storage unit which communicates with the in-vehicle camera device 100 through wired or wireless means. In yet another embodiment, the readable recording medium device may be a storage unit outside the in-vehicle camera device 100, and be connected through a reader or a connector of the in-vehicle camera device 100 to access the program codes in the storage unit.

Figure 13:
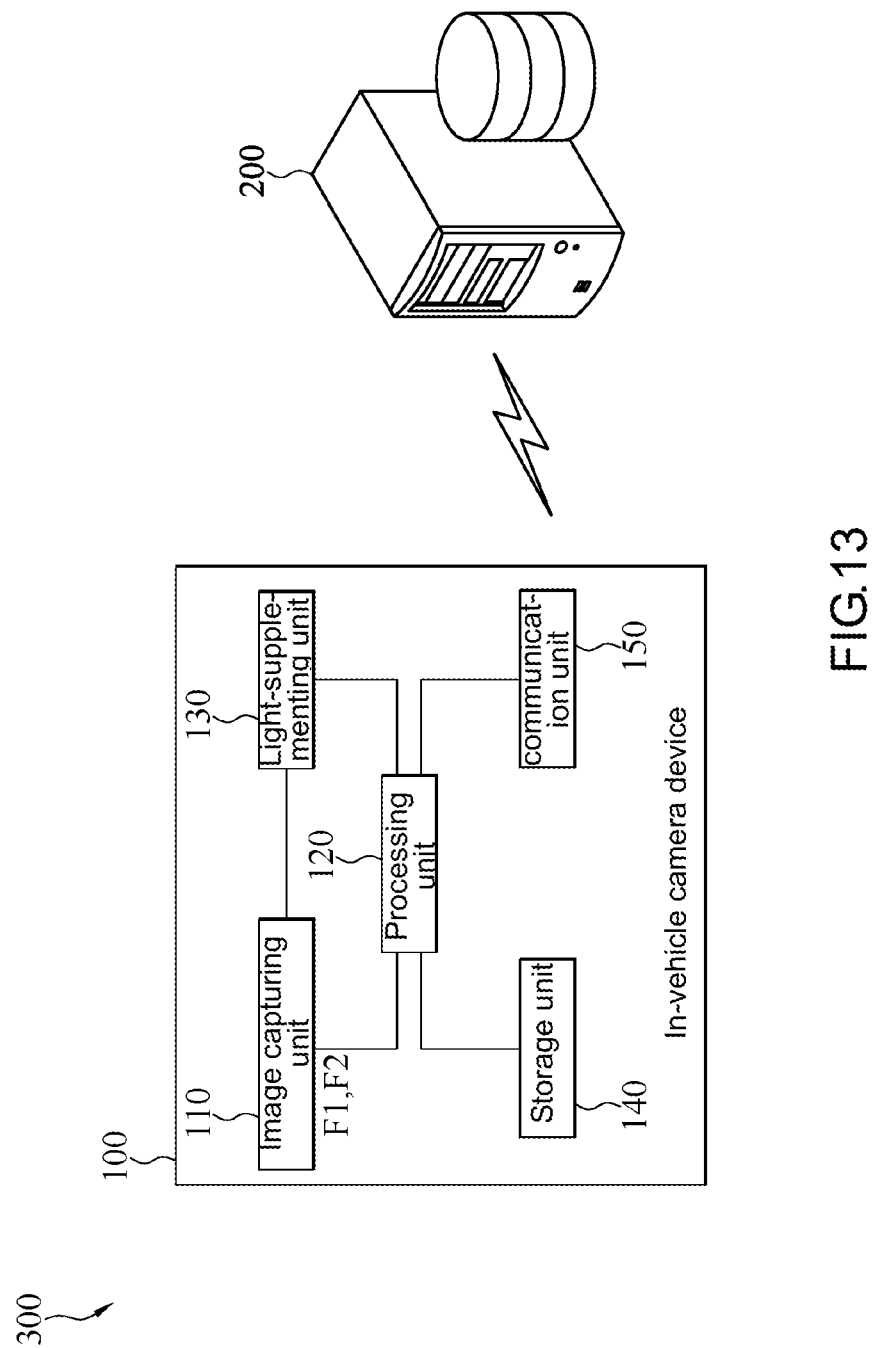
FIG. 13 is a brief schematic diagram of a monitoring system according to an embodiment.

FIG. 13 shows a brief schematic diagram of a monitoring system according to an embodiment. Referring to FIG. 13, in one embodiment, the in-vehicle camera device 100 further includes a communication unit 150 coupled to the processing unit 120. At this point, the in-vehicle camera device 100 wirelessly communicates with a server device 200 through the communication unit 150. Further, the method for estimating a moving speed of a vehicle according to any of the embodiments of the present invention may be performed by a monitoring system 300 consisting of the in-vehicle camera device 100 and the server device 200.

Figure 14:
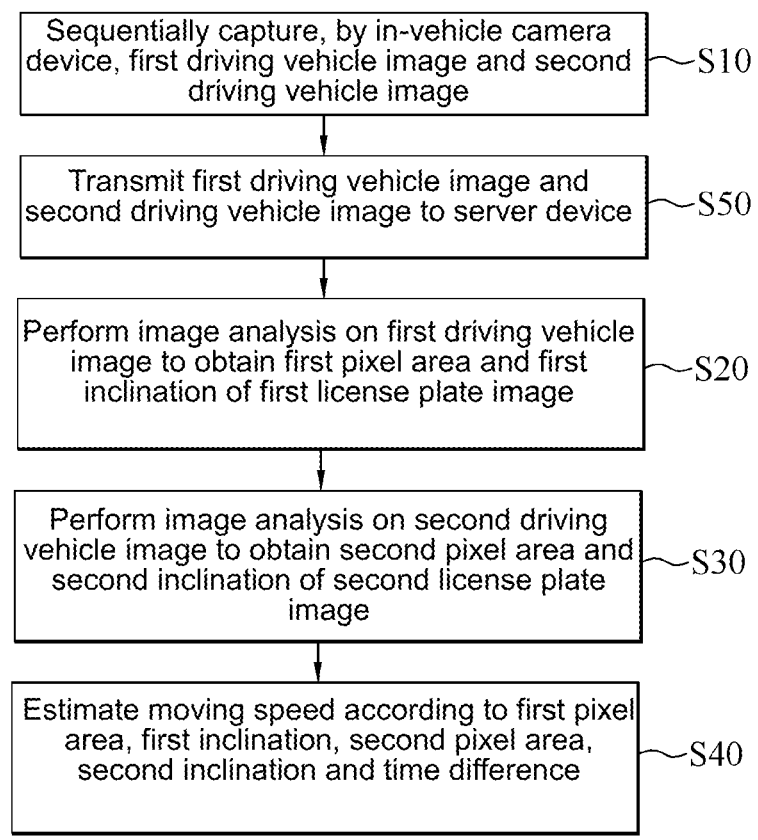
FIG. 14 is a flowchart of a method for estimating a moving speed of a vehicle according to another embodiment.

FIG. 14 shows a flowchart of a method for estimating a moving speed of a vehicle according to another embodiment. Referring to FIG. 13 and FIG. 14, in the method for estimating a moving speed of a vehicle according to another embodiment, the monitoring system 300 can sequentially capture at the first time point and the second time point, by the image capturing unit 110 of the in-vehicle camera device 100, the first driving vehicle image F1 and the second driving vehicle image F2 of the vehicle C1 entering the image capturing range of the image capturing unit 110 (step S10). The monitoring system 300 can transmit the first driving vehicle image F1 and the second driving vehicle image F2 captured to the server device 200 through the communication unit 150 of the in-vehicle camera device 100, so as to have the server device 200 perform subsequent processing and estimation of the moving speed (step S50). After the server device 200 receives the first driving vehicle image F1 and the second driving vehicle image F2, the monitoring system 300 can perform image analysis on the first driving vehicle image F1 through the server device 200, so as to obtain the size of the first pixel area of the first license plate image M1 and the value of the first inclination θ1 of the first license plate image M1 from the first driving vehicle image F1 (step S20), and perform image analysis on the second driving vehicle image F2, so as to obtain the size of the second pixel area of the second license plate image M2 and the value of the second inclination θ2 of the second license plate image M2 from the second driving vehicle image F2 (step S30). Then, the monitoring system 300 can estimate the moving speed of the vehicle C1 according to the first pixel area, the first inclination θ1, the second pixel area, the second inclination θ2 and the time difference (i.e., the difference between the first time point and the second time point) through the server device 200 (step S40).

Referring to FIG. 5 and FIG. 14, in step S20 according to an embodiment, the server device 200 can position an image of a license plate in the first driving vehicle image F1 so as to position the range of the first license plate image M1 in the first driving vehicle image F1 (step S21). Then server device 200 then calculates the size of the first pixel area of the first license plate image M1 on the basis of the first license plate image M1 obtained (step S22). The server device 200 can further perform image correction on the first license plate image M1 so as to turn the first license image M1 upright and obtain the value of the first inclination θ1 of the first license plate image M1 (step S23).

Referring to FIG. 8 and FIG. 14, in step S30 according to an embodiment, the server device 200 can position an image of a license plate in the second driving vehicle image F2 so as to position the range of the second license plate image M2 in the second driving vehicle image F2 (step S31). Then server device 200 calculates the size of the second pixel area of the second license plate image M2 on the basis of the second license plate image M2 obtained (step S32). The server device 200 can further perform image correction on the second license plate image M2 so as to turn the second license image M2 upright and obtain the value of the second inclination θ2 of the second license plate image M2 (step S33).

Referring to FIG. 11 and FIG. 14, in step S40 according to an embodiment, the server device 200 can convert the size of the first pixel area of the first license plate image M1 to a corresponding first relative distance D1 (step S41), and convert the size of the second pixel area of the second license plate image M2 to a corresponding second relative distance D2 (step S42). The server device 200 can later estimate, according to the first relative distance D1, the first inclination θ1, the second relative distance D2 and the second inclination θ2, the moving distance D3, that the vehicle C1 moves within the time difference (step S43). The server device 200 can finally estimate the moving speed of the vehicle C1 according to the moving distance D3 obtained and the time difference (step S44).

At this point, although step S20 to step S40 are performed by the server device 200, implementation details of the server device 200 are substantially the same as the implementation details of the processing unit 120 of the in-vehicle camera device 100, and such repeated implementation details are omitted herein.

It should be noted that, in the method for estimating a moving speed of a vehicle according to any of the embodiments of the present invention, although it is assumed that the first driving vehicle image F1 and the second driving vehicle image F2 are captured while the in-vehicle camera device 100 is in a stationary state, the present invention is not limited thereto. For example, the first driving vehicle image F1 and the second driving vehicle image F2 may also be captured when the in-vehicle camera device 100 is in a moving state. However, at this point, when estimating the moving speed of the vehicle C1, the moving speed of the in-vehicle camera device 100 and the mounting angle of the in-vehicle camera device 100 need to be taken into account. Details of incorporating variant factors generated during a moving process of the in-vehicle camera device 100 into account on the technical basis of the present invention can be conceived of by a person skilled in the art, and such repeated details are omitted herein.

In some embodiments, the monitoring system 300 may be a detection system of the police force, the in-vehicle camera device 100 may be mounted in a police vehicle, and the server device 200 communicating with the in-vehicle camera device 100 may be arranged at a police station.

In some embodiments, the in-vehicle camera device 100 may be implemented by an automated license plate reader (ALPR).

In conclusion, the in-vehicle camera device, the monitoring system and the method for estimating a moving speed of a vehicle according to embodiments of the present invention achieve license plate recognition (i.e., the first license plate image and the second license plate image) by performing image analysis on the first driving vehicle image and the second driving vehicle image sequentially captured, while estimate the moving speed of the vehicle through the first pixel area, the first inclination, the second pixel area, the second inclination and the time difference obtained by analysis. Thus, the present invention better dynamically determines whether the vehicle exceeds a speed limit without having to measure the moving speed of the vehicle by more costly speed detection devices such as laser speedometers.

While the invention has been described in terms of what is presently considered to be the most practical and preferred embodiments, it is to be understood that the invention is only illustrative and needs not to be limited to the above embodiments. It should be noted that, equivalent variations and replacements made to the embodiments by a person skilled in the art are to be encompassed within the scope of the present invention. Therefore, the scope of the present invention is to be accorded with the appended claims.

What is claimed is:

1. A method for estimating a moving speed of a vehicle, comprising:
sequentially capturing, by an image capturing unit, a first driving vehicle image and a second driving vehicle image, wherein the first driving vehicle image and the second driving vehicle image have a time difference therebetween;
performing image analysis on the first driving vehicle image to obtain a first pixel area and a first inclination of a first license plate image;
performing image analysis on the second driving vehicle image to obtain a second pixel area and a second inclination of a second license plate image; and
estimating the moving speed according to the first pixel area, the first inclination, the second pixel area, the second inclination and the time difference, comprising:
converting the first pixel area to a corresponding first relative distance;
converting the second pixel area to a corresponding second relative distance;
calculating a moving distance of the vehicle according to the first relative distance, the second relative distance, the first inclination and the second inclination; and
estimating the moving speed according to the moving distance and the time difference.

2. The method according to claim 1, wherein the step of performing image analysis on the first driving vehicle image to obtain the first pixel area and the first inclination of the first license plate image comprises:
obtaining the first license plate image from the first driving vehicle image;
calculating the first pixel area of the first license plate image; and
turning the first license plate image upright to obtain the first inclination.

3. The method according to claim 1, wherein the step of performing image analysis on the second driving vehicle image to obtain the second pixel area and the second inclination of the second license plate image comprises:
obtaining the second license plate image from the second driving vehicle image;
calculating the second pixel area of the second license plate image; and
turning the second license plate image upright to obtain the second inclination.

4. An in-vehicle camera device, comprising:
an image capturing unit, sequentially capturing a first driving vehicle image and a second driving vehicle image of a vehicle, wherein the first driving vehicle image and the second driving vehicle image have a time difference therebetween; and
a processing unit, performing image analysis on the first driving vehicle image to obtain a first pixel area and a first inclination of a first license plate image, performing image analysis on the second driving vehicle image to obtain a second pixel area and a second inclination of a second license plate image, and estimating the moving speed of the vehicle according to the first pixel area, the first inclination, the second pixel area, the second inclination and the time difference,
wherein the step of estimating the moving speed of the vehicle comprises:
converting the first pixel area to a corresponding first relative distance;
converting the second pixel area to a corresponding second relative distance;
calculating a moving distance of the vehicle according to the first relative distance, the second relative distance, the first inclination and the second inclination; and
estimating the moving speed according to the moving distance and the time difference.

5. The in-vehicle camera device according to claim 4, wherein the step of performing image analysis on the first driving vehicle image comprises:

obtaining the first license plate image from the first driving vehicle image;

calculating the first pixel area of the first license plate image; and turning the first license plate image upright to obtain the first inclination.

6. The in-vehicle camera device according to claim 4, wherein the step of performing image analysis on the second driving vehicle image comprises:

obtaining the second license plate image from the second driving vehicle image;

calculating the second pixel area of the second license plate image; and turning the second license plate image upright to obtain the second inclination.

7. A monitoring system, comprising:

an in-vehicle camera device, sequentially capturing a first driving vehicle image and a second driving vehicle image of a vehicle, wherein the first driving vehicle image and the second driving vehicle image have a time difference therebetween; and a server device, receiving the first driving vehicle image and the second driving vehicle image, performing image analysis on the first driving vehicle image to obtain a first pixel area and a first inclination of a first license plate image, performing image analysis on the second driving vehicle image to obtain a second pixel area and a second inclination of a second license plate image, and estimating the moving speed of the vehicle according to the first pixel area, the first inclination, the second pixel area, the second inclination and the time difference, wherein the step of estimating the moving speed of the vehicle comprises:

converting the first pixel area to a corresponding first relative distance;

converting the second pixel area to a corresponding second relative distance;

calculating a moving distance of the vehicle according to the first relative distance, the second relative distance, the first inclination and the second inclination; and estimating the moving speed according to the moving distance and the time difference.

8. The monitoring system according to claim 7, wherein the step of performing image analysis on the first driving vehicle image comprises:

obtaining the first license plate image from the first driving vehicle image;

calculating the first pixel area of the first license plate image; and turning the first license plate image upright to obtain the first inclination.

9. The monitoring system according to claim 7, wherein the step of performing image analysis on the second driving vehicle image comprises:

obtaining the second license plate image from the second driving vehicle image;

calculating the second pixel area of the second license plate image; and turning the second license plate image upright to obtain the second inclination.

* * * * *